March 10, 1964   F. K. KNOHL   3,124,031
SCREW FASTENER
Filed Oct. 20, 1958
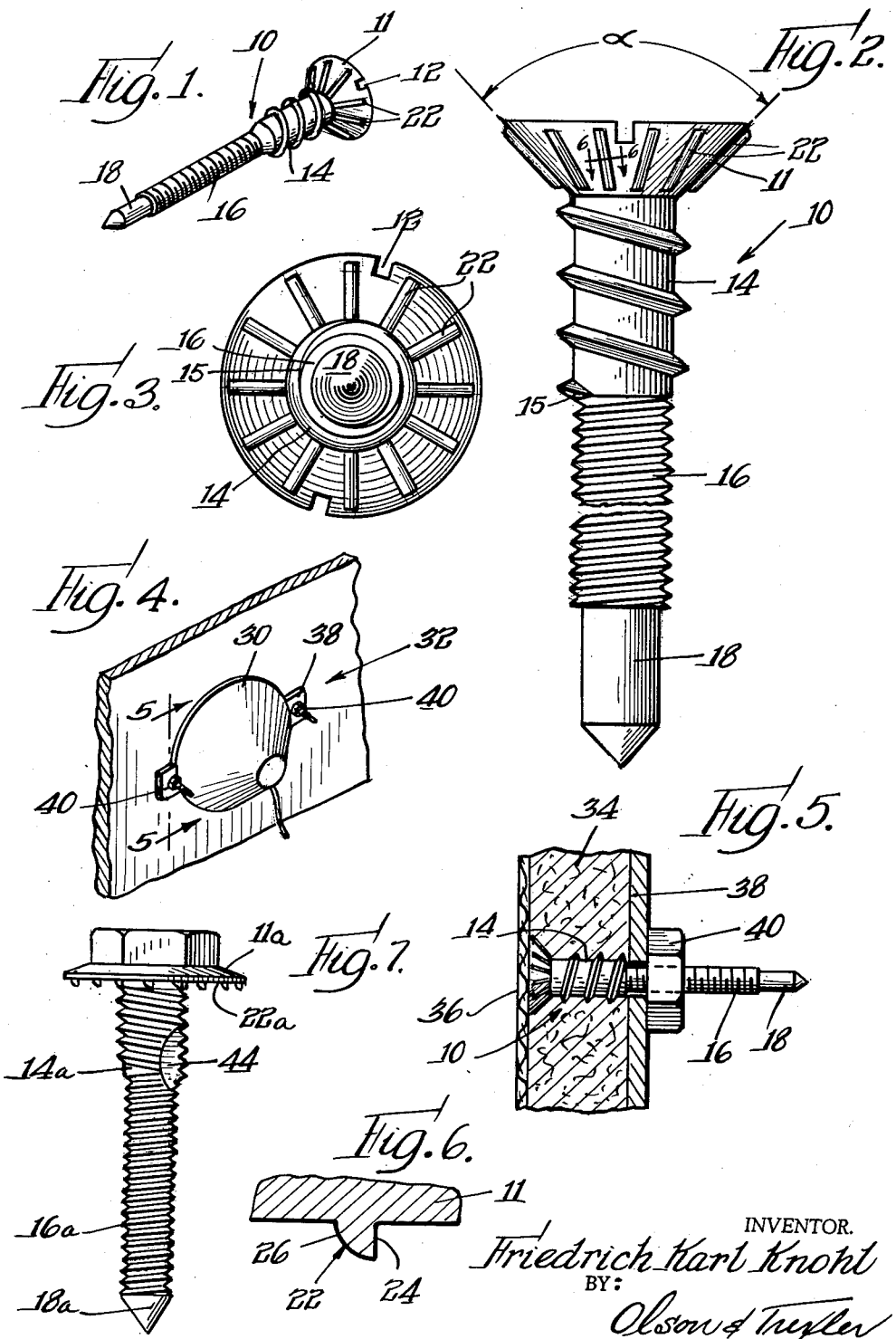
INVENTOR.
Friedrich Karl Knohl
BY:
Olson & Trexler
Atty.

United States Patent Office 3,124,031
Patented Mar. 10, 1964

3,124,031
SCREW FASTENER
Friedrich Karl Knohl, Chicago, Ill., assignor to Illinois
Tool Works Inc., a corporation of Delaware
Filed Oct. 20, 1958, Ser. No. 768,317
1 Claim. (Cl. 85—47)

This invention relates, generally, to screw fasteners and, more particularly, to fasteners of the type which are adapted when applied to a work piece or panel to accommodate an internally threaded fastener member, such as a nut. There are many instances or applications in which it is desirable to secure a panel in position upon a complementary panel by the use of screw fasteners. In certain of these applications, it is extremely advantageous to employ internally threaded fastener members, such as nuts, in cooperation with a screw to hold the work pieces in finally secured position. Efforts heretofore made in an attempt to solve the above mentioned problems, and with which I am familiar, fall far short of a satisfactory solution. It is, therefore, one of the primary objects of the present invention to provide a novel screw fastener which will meet the requirements referred to above.

More specifically, the invention contemplates a screw member as above referred to, which may be produced by conventional manufacturing processes, thereby holding to a minimum the ultimate cost to the user, and to this end it is contemplated to provide a fastener of the type in question which will accommodate an internally threaded fastener member or nut after the screw has been inserted through work pieces or panels, and when the nut is tightened upon the screw member, said screw member will be positively secured against rotation.

It is a further object to provide a screw fastener for the purposes set forth above which will automatically lock itself against rotation within the work part and thereby assure complete tightening of a nut member on the screw without stripping threads in the screw when the nut is finally tightened in place.

Still more specifically, the present invention contemplates a self-locking screw as set forth above, having a novel arrangement of thread convolutions along its shank, one for engaging the work and the other for accommodating a nut member.

Other and further objects and advantages of the present invention will be apparent from the following description when taken in connection with the accompanying drawings, wherein:

FIG. 1 is a perspective view of a preferred embodiment of the invention;

FIG. 2 is an enlarged elevational view of the device shown in FIG. 1;

FIG. 3 is a bottom view of the device shown in FIG. 2;

FIG. 4 is a perspective view of an installation for mounting an audio speaker on a cabinet member;

FIG. 5 is a partial cross-sectional view of such an installation as taken substantially along line 5—5 in FIG. 4;

FIG. 6 is a fragmentary section of the locking or rotation resisting means on the clamping side of the screw head, substantially as taken along line 6—6 in FIG. 2; and FIG. 7 is an elevational view of a secondary embodiment of the invention.

Referring now in greater particularity to the accompanying drawings and, in particular, FIGS. 1 through 6, there will be seen a screw member generally designated 10 comprised of a head element 11 having suitable means or slot 12 for accommodating a turning tool, such as a screw driver (not shown), and a shank having a plurality of sections of differing diameters which decrease in measurement in the direction away from the head. In the present instance, there are three diameters shown in shank sections or portions 14, 16, and 18. Section 14 is immediately adjacent the head and has the greatest diameter of any of the shank sections. In the preferred embodiment, section 14 is provided with a left-hand thread having thread or helix angle which does not exceed 45 degrees relative to a plane perpendicular to the axis of the screw and with the leading endmost part of the thread convolution decreasing progressively in diameter substantially to the root diameter at the end of section 14 as indicated by the numeral 15 in FIGS. 2 and 3. The thread of section 14 is of rather coarse pitch and would take the form of either a "Type A" thread or a wood screw thread.

Section 16 has a diameter which is less than the diameter of section 14 and is provided with a right-hand thread. This thread has a helix angle which is preferably less than the helix angle or lead of the coarse pitch thread on the section 14. In the preferred embodiment, the screw has a standard machine screw thread on section 16 presenting a helix angle of approximately 12 degrees to a plane normal to the axis of the screw. The major or crest diameter of the thread convolutions on the section 16 is preferably equal to or less than the minor or root diameter of section 14.

The diameter of section 18 is slightly less than the outer diameter of section 16. Preferably, the diameter of section 18 is equal to or less than the root diameter of the adjacent threaded section 16. Section 18 is unthreaded and provided with a frusto-conical or gimlet-type point, for reasons set forth hereinafter.

The clamping face of the flat head 11 forms an included angle in excess of 82 degrees. In FIG. 2, this angular relationship designated by "$\alpha$" is approximately 100 degrees. The clamping face of the head 11 is also provided with a plurality of circumferentially spaced work engaging means or ribs 22. In the disclosed embodiment, the means 22 are in the form of substantially radially extending nubbins or protuberances. These radial protuberances 22 present an abrupt face 24 in the direction of rotation of the head and an inclined face 26 on the opposite side.

A typical application of the screw fastener contemplated by the present invention, as shown in FIGS. 4 and 5, is in the installation of audio speakers 30 in radio or television cabinets generally designated 32. In utilizing the above described invention, the screw 10 is driven from the front side of the cabinet through a panel 34. Then a cloth or plastic sheet 36, FIG. 5, which comprises the decorative front covering for the cabinet, is applied, thereby concealing the exposed head of the screw element as well as the aperture through which sound waves may pass from the speaker 30 later to be mounted, as shown in FIG. 2. Normally, the cabinet panel 34 is made from materials such as pressed wood fiber or inexpensive soft woods having low stripping characteristics.

In the present instance, speaker mounting brackets 38 are telescopically associated with the exposed section 16 of the screw member 10 and a nut 40 is applied to said section. It has been found that a conical screw head having a conventionally smooth clamping surface is not sufficient to prevent rotation of the screw in a work panel when final clamping torque is applied by the nut 40. It has been found advisable to provide a broad non-cutting clamping surface on the under face of the head which had an included angle of approximately 100 degrees and also to provide the nubbins or protuberances 22 for increasing frictional resistance to rotational forces resulting from the final tightening of the nut 40. The nubbins 22 in preventing the screw from rotation during the application of the nut counteracts the stripping out of screw 10 from panel 34.

By having the helix angle of the coarse pitch thread on the screw section 14 not in excess of 45 degrees, the danger of stripping threads, when the nut 40 is forced axially, is avoided. For example, should the lead of the coarse pitch thread conform with the lead of a helical drive fastener rib, forces applied axially to the screw member, as, for example, a power tool force applied to the nut 40, may have a tendency to force the screw axially with respect to its complementary work piece. By having the entering end of the screw shank, namely, the pilot section 18 provided with a sharp entering end, the ease with which the screw member may be inserted properly within a work piece is materially enhanced.

In FIG. 7 a modified screw is shown, wherein the various parts of the screw are indicated by numerals corresponding to the numerals in the other figures, except that the numerals in FIG. 7 bear the suffix "a." The section 14a of the modified screw, as well as the section 16a, are provided with a standard machine screw thread. It will also be noted that the screw of FIG. 7 differs from the previously described screw in that the unthreaded pilot section is omitted and in place thereof a gimlet-point 18a is provided. The head 11a is in the form of a hexagon having a clamping flange or washer face extending outwardly from the periphery thereof on the clamping side. This washer face is provided with protuberances 22a, which serve like the previously described protuberances 22, to increase frictional resistance between the head of the screw and the work whereby to counteract tendency for the screw member to rotate within the work piece when the nut is applied thereto. It will also be noted that the modified screw of FIG. 7 is provided with a longitudinal slot 44 at the entering end of section 14a, and this slot traverses the thread convolutions in such a manner as to provide a serrated cutting edge. The modified screw is particularly suitable to be used as a mounting screw in relatively thin panel members or work sheets. It will also be apparent that the modified screw of FIG. 7 with its serrated cutting edge causes the screw to ream the aperture in the work part.

While for purposes of illustrating the applicant's invention certain embodiments have been disclosed and described herein, it should be understood that the invention contemplates other modifications and changes without departing from the spirit and scope of the appended claim.

The invention is claimed, as follows:

A mounting screw formed from a multi-diameter blank and adapted for application to an apertured workpiece having a given thickness and for receiving a complementary fastener such as a nut, said screw comprising an elongated shank having a length substantially greater than said thickness, a head integral with a trailing end of said shank and having a laterally outwardly projecting clamping face and a tapering free entering end, said shank comprising a first section adjacent said head having a length for extending substantially entirely through an apertured workpiece and including integral helical left-hand thread convolutions having first root and crest diameters and a helix angle less than about 45 degrees, a second section extending from said first section and including right-hand machine screw helical thread convolutions having predetermined root and crest diameters, said root diameter of said first mentioned thread convolutions being at least as great as and the crest diameter of said first mentioned thread convolutions being substantially greater than the crest diameter of said machine screw thread convolutions for promoting full depth secure engagement between said first mentioned thread convolutions and an apertured workpiece through which said second mentioned thread convolutions may freely pass during application of the screw to the workpiece, slot means at the entering end portion of said first shank section defined by a surface intersecting the periphery of said first shank section and a portion of said first mentioned thread convolutions for providing a thread cutting edge at said intersection for facilitating application of the screw into an unthreaded aperture in the workpiece, said head including means cooperable with a driving tool and a plurality of integral protuberances circumferentially spaced around and projecting from said clamping face for engagement with a workpiece, each of said protuberances presenting a cutting face toward the direction of tightening rotation of the first mentioned shank section relative to a workpiece for digging into a workpiece and resisting stripping of the first shank section from the workpiece.

References Cited in the file of this patent

UNITED STATES PATENTS

| | | |
|---|---|---|
| 56,124 | Tell | July 3, 1866 |
| 148,721 | Lowensohn | Mar. 17, 1874 |
| 234,759 | Eckford | Nov. 23, 1880 |
| 1,333,372 | Barrow | Mar. 9, 1920 |
| 1,467,824 | Ahlers | Sept. 11, 1923 |
| 1,826,988 | Campbell | Oct. 13, 1931 |
| 1,827,615 | Rosenberg | Oct. 13, 1931 |
| 1,909,476 | Trotter | May 16, 1933 |
| 2,015,159 | Rosenberg | Sept. 24, 1935 |
| 2,019,049 | Hoke | Oct. 29, 1935 |
| 2,156,350 | Olson | May 2, 1939 |
| 2,266,758 | Holtz | Dec. 23, 1941 |
| 2,833,326 | Knohl | May 6, 1958 |

FOREIGN PATENTS

| | | |
|---|---|---|
| 113,183 | Great Britain | Feb. 14, 1918 |
| 747,910 | Great Britain | Apr. 18, 1956 |